INVENTOR.
WALTER D. BERNHART
WILLIAM A. FETTER
BY *Robert E. Breidenthal*
ATTORNEY

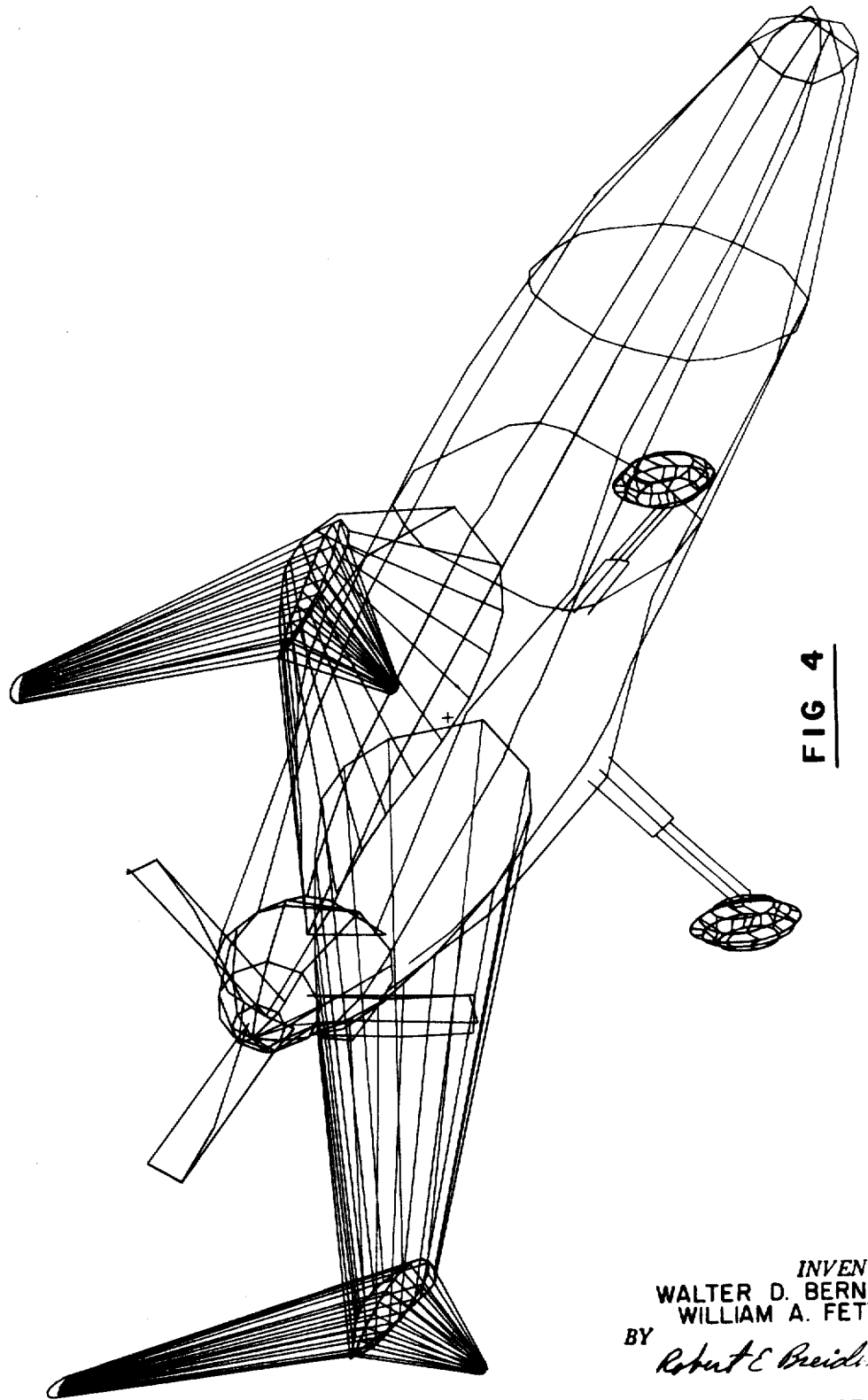

United States Patent Office 3,519,997
Patented July 7, 1970

3,519,997
PLANAR ILLUSTRATION METHOD AND APPARATUS
Walter D. Bernhart and William A. Fetter, Wichita, Kans., assignors, by mesne assignments, to Computer Graphics, Inc., Wichita, Kans., a corporation of Kansas
Filed Nov. 13, 1961, Ser. No. 151,909
Int. Cl. G06f 7/00, 9/12
U.S. Cl. 340—172.5                    3 Claims This invention relates to new and useful improvements in general-purpose digital computing apparatus and methods of operating general-purpose digital computers. More specifically, the present invention has to do with apparatus and methods of the above character for producing numerical data typifying in two variables selected aspects of given data having two or three variables. The invention has particular applicability to the control of plotting machines for making planar representations of three-dimensional objects.

The making of planar representations (perspectives and various types of axonometric projections) of both two- and three-dimensional subjects (natural and artificial) can be difficult and usually requires a great deal of skilled, tedious effort. This is nonetheless true even when the positions of various points characterizing the subject or object are known, directly or indirectly, as to their coordinates with respect to a coordinate axis system.

For example, considerable effort is required to make a planar, perspective representation of a set of points sufficient to characterize the shore line of a mapped lake from an arbitrarily selected viewpoint even though the coordinate positions of the points can be readily determined from the map by scaling or the like. Analogous and at least equal difficulties are encountered in the case of making representations of points characterizing a mapped contour line, even though the coordinate positions of the points can be ascertained or determined from the map (in two or three dimensions).

Still greater difficulties must be surmounted to make a planar, perspective representation of a set of noncoplanar points characterizing a subject, this being especially true if the aspect of the subject being characterized is irregular (such as, for example, random points not including groups of points lying on lines parallel to mutually perpendicular axes).

As in the case of making planar, perspective representations, it is difficult to make a representation of sets of points, such as discussed above, constituted of such points being projected by parallel lines in an arbitrary direction upon an arbitrarily positioned plane (axonometric, obliques, etc., projections).

It is often the case that features of predominant interest concerning a particular subject can be exactly defined or approximated to a desired degree of accuracy by a judicious selection of a sufficient number of points and judicious selection of pairs of such points connected by straight-line segments. As a simple example, salient features of a rectangular block can be characterized by giving the coordinates of the eight apices and by designating pairs of points connected by edges. Obviously, a feature of interest that can be characterized by a curved line can in turn be defined to any desired degree of accuracy by a sequence of points along the curve connected in serial order by straight-line segments.

By adopting a convention any necessity for designating the pairs of points to be connected by straight-line segments can be avoided, at least in part. Such convention involves giving the positions of points characterizing a feature of interest in the subject in a sequence such that it is understood that successive points are connected by straight-line segments unless otherwise noted. For example, the positions of the apical points of a rectangular block can be given in a sequence such that an edge connects each point in the sequence with the immediately following point, and such that every pair of points connected by an edge will appear in immediate succession in the sequence. In this example, topology requires that each point must be given in the sequence more than once.

A sequence can be given that will, by convention, include all points and line segments with an appropriate indication between any successive points not to be connected by a line segment that such is the case. In this manner multiple indication of a single-line segment can be avoided.

Assuming points, or that a sequence of points (with appropriate notation as to line-segment omission) has been selected, the task of making planar representations (perspective or parallel projection) of the points and the straight-line segments for complex subjects is not only formidable but is usually very time consuming. The time factor totally apart from considerations of economy and difficulty can be crucial as swift preparation of planar representations of the types discussed above from two- and three-dimensional positional data can be extremely important from a military point of view.

The principal aim of the invention is to provide a digital computer routine that will (in conjunction with a general-purpose digital computer and the provision of positional data of points) produce an output definitive of the two-dimensional positions of points of a planar representation of the given points.

Another principal aim of the invention is to provide a digital computer routine that will (in conjunction with a general-purpose digital computer and the provision of positional data of a sequence of points) produce an output definitive of the two-dimensional positions of a corresponding sequence of points of a planar representation of the given points.

A further principal aim of the invention is to provide a digital computer routine that will (in conjunction with a general-purpose digital computer and the provision of positional data of a sequence of points with a line-segment omission instruction interposed therein) produce an output definitive of the two-dimensional positions of a corresponding sequence of points of a planar representation of the given points with the omission instruction retained in its relative position in the output sequence.

An additional aim of the invention is to provide a routine in accordance with the preceding aims which will include selectively-operable subroutines for determining the character of the planar representation—parallel lines of projection of the given points, or perspective.

Another aim of the invention in accordance with the preceding aims is the provision of a subroutine that will produce two sets of output data characterizing planar, perspective representations that differ solely as having spaced viewpoints whereby the two representations can constitute a stereoscopic pair.

Yet another aim of the invention in accordance with the preceding aims is to provide a subroutine for augmenting the given input data by generating a complementary set of positional points that are symmetrical with the given points as to a given plane of symmetry.

A further purpose of the invention is to produce the output data obtained on realizing the preceding aims in a form compatible with the input requirements of a plotting machine, and to operate the latter to obtain the planar representation.

Broadly, the invention involves the combination of a digital computer and a routine operative to derive;

from numerical input data definitive of the positions of a set of object points, a plane, and a specified mode of projection of the object points on said plane; two-coondinate numerical data specifying the positions of points in the given plane obtained by projection from the object points according to said specified mode, said routine comprising: (a) a first subroutine operative to compute the position of Cartesian coordinate axes in the given plane relative to the given set of object points, and (b) a second subroutine operative to compute the projection of each given point on the plane with reference to the Cartesian coordinate axes.

According to the invention, the various modes of projection can be perspective or axonometric.

Another aspect of the invention involves using the computed numerical output as to the coordinate positions of points to control planar plotting apparatus to produce a tracing constituted of a succession of straight-line segments extending between the sequence of computed point positions.

Still other aspects of the invention involve producing related perspective tracings or representations such that they constitute stereoscopic pairs, or simply to the production of numerical output such that plotting machines can produce such stereoscopic perspective representations from such data. Where the object to be projected has a plane of symmetry, the invention also involves means for generating numerical data definitive of the positions of points to one side of such plane upon being presented only with data specifying the positions of the object points on the other side of such plane, thereby simplifying and reducing the amount of necessary input data.

The invention will be best understood in the light of the following description thereof taken in conjunction with the accompanying drawings, wherein.

Figure 1:
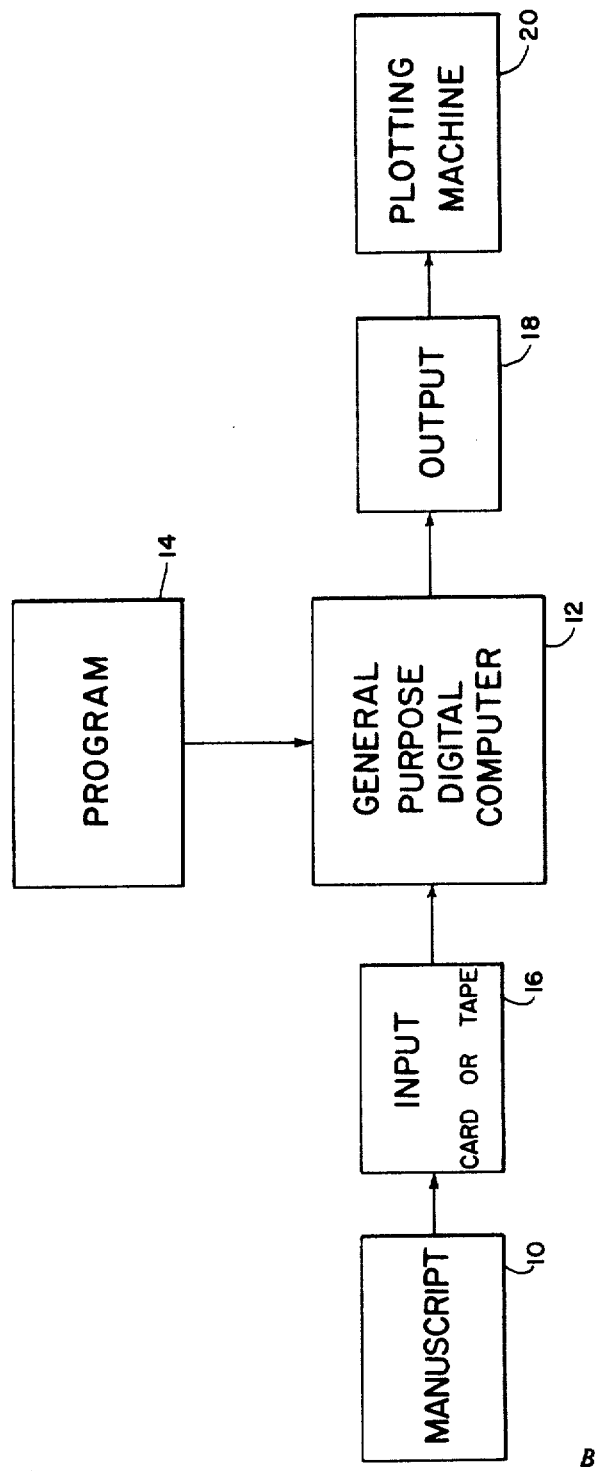
FIG. 1 is a block diagram of the apparatus of the invention.

Attention is first directed to FIG. 1 for a comprehensive understanding of the invention. The numeral 10 designates the manuscript or initial tabulation of data concerning the location of points selected as descriptive of the object or subject of which a planar representation is desired. The points are preferably given in a sequence such that features of interest of the object exist that are or approximately are straight lines connecting consecutively listed points, with the convention (compatible with the language of the computer and its program) being adopted to interpose between consecutively listed points an instruction that this is not the case (no line segment to connect such pair of points). Where the object contains a plurality of features which may be of interest separately or in various combinations with each other, the points listed in the manuscript can carry further information in connection with each point definitive of the feature or features (compatible with the language of the computer and its program) with which the point is associated, whereby a basis for selective representation can be made of points pertaining to various separate features or any desired combination of features.

For example, when the object is an airplane, points characterizing various features of an airplane such as wings, fuselage, fuel system, tail assembly, pilot's compartment, landing gear, hydraulic system, etc., can be distinctively labeled or identified as to the particular feature or features to which they pertain so that particular sets of points can be selected or sorted out in the program of the computer on appropriate instruction.

Compatible with the computer language, the manuscript also can contain at appropriate positions in its listings of points various instructions as to the operations to be performed by the computer, the features (the subgroup or combination of subgroups of points to be included in the planar representation or projection), the generation of symmetrically positioned object points, the preparation of two distinct perspective projections (related as a stereoscopic pair), the field of interest in the object, the character of projection desired (perspective or axonometric) and information pertinent to the selected mode of projection, such as the eye point and plane position for perspectives and angular orientation of the plane for parallel line types of projection. The exact form and character of information presented in the manuscript will be dependent upon the computer language developed as will be readily understood by computer programmers. A great latitude of arbitrary choice can be exercised in this area as a matter of carrying forward established procedures well within the expected skill of computer programmers in the light of the forthcoming discussion of the objectives and manner of data handling.

The numerals 12 and 14 designate respectively a general-purpose digital computer (for example, an International Business Machines Model 705) and a program (including a program controller and routines, and subroutines therefor). The numeral 16 designates the information of the manuscript 10 translated as is customary in the art into a form acceptable to the input devices of the computer 12. Usually the information 16 is in the form of punched cards or preferably in the form of magnetic tape. It will be understood that the program 14, including the various subroutines (trigonometric, etc.) and program control, is preferably and typically in the form of magnetic tapes that can be read at high speed into the computer 12 as required.

The output of the computer 12 is indicated at 18. Such output 18 includes the computational results (two-dimensional Cartesian coordinates of a sequence of computed points) as well as optionally interspersed instructions (line segment omission, tracing in specified ink color, etc.) for a planar plotting apparatus indicated at 20. The output 18 can be considered as having been post processed (as a part of the program 14), or post processing equipment (not shown) can be interposed between the output 18 and the plotting machine 20 so that the output 18 is compatible or can be rendered compatible to the input of the plotting machine 20. A variety of types of planar plotting machines have been devised that can be employed for use in the practice of this invention. For example, various pen types such as the Boeing Plotter (The Boeing Company), the Moseley Plotter (575 Model), the Benson-Lehner (Model J) and the Electronic Associates Plotter can be used. Cathode Ray types can also be employed, such as the planar plotters of Stromberg-Carlson (General Dynamics) and of International Business Machines (Model 740). Electrosensitive types can also be used, such as the Lockheed Hogan System and the Tally Model 503 (Tally Register Company).

The output 18 is compatible (or is made compatible by post processing equipment) with the input requirements of the particular type of planar plotting device 20 selected, and this is usually and preferably in the form of magnetic tape. FIG. 4 is an example of an end product obtained through the use of the Moseley Model 575 Plotter fed with magnetic tape. The planar representation shown in FIG. 4 was obtained from an original set of data comprised of the three-dimensional coordinates of a plurality of points selected from the structure of an aircraft processed as explained presently by the digital computer 12 and the program 14 to produce the output 18 (input for the plotting device 20).

In obtaining the computed component of the data suitable for making a perspective representation, the manuscript 10 has included information as to the positions (usually in terms of three-dimensional coordinates) of the object points, the eye point (position to which projection lines are to converge), the center of interest of the object (an arbitrarily selected point usually chosen to be near the center of a volume containing the object points), and the desired position of the plane to which the object points are projected. The position of the plane can be specified in a number of ways; however, it is convenient to specify the plane as being normal to a line extending through the center of interest point and the eye point at a position where an arbitrary constant "$k$" defines the ratio of the distance from the eye point to the plane of the distance from the eye point to the center of interest.

The following mathematical discussion is based on such mode of specification of the position of the plane; however, the invention and the claims are deemed to cover other forms of plane position specification with corresponding reformation of the computational equations.

Figure 2:
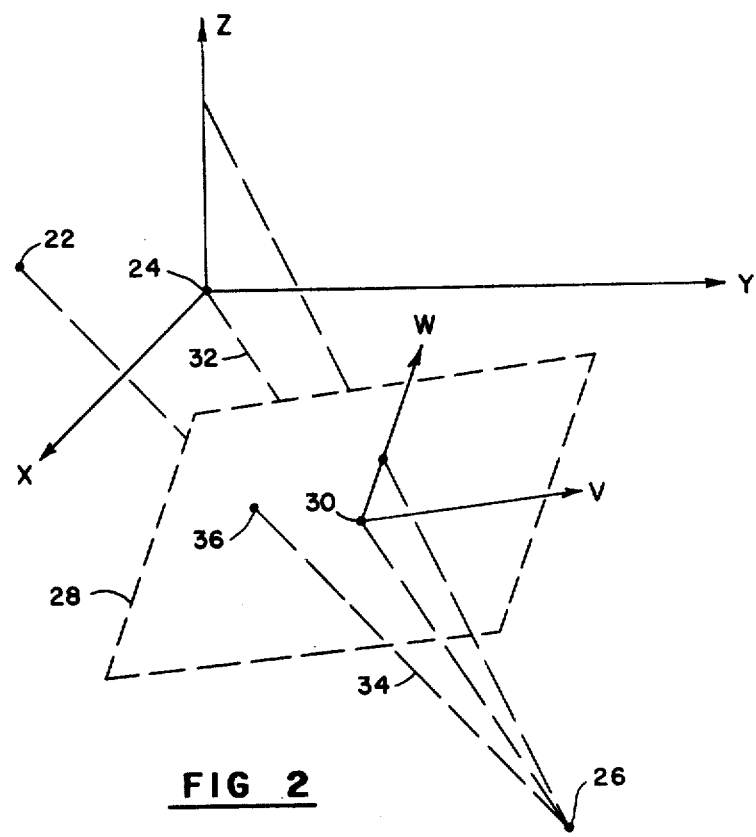
FIG. 2 is a graphical illustration of the manner in which perspective projection points are determined.

Attention is directed to FIG. 2, wherein an object point is designated at 22, a center of interest point is designated at 24, and an eye point is designated at 26, all defined in a three-dimensional coordinate system (mutually perpendicular axes X, Y and Z) respectively as ($x_i$, $y_i$, $z_i$), (O, O, O), and ($x_e$, $y_e$, $z_e$). The numeral 28 designates the plane (picture plane) on which object points are projected, the plane 28 being perpendicular to a line connecting points 24 and 26. A pair of mutually perpendicular coordinate axes V and W are erected in the plane 28 such that the A axis and the W axis are coplanar, with the origin being located at the point 30 of intersection of a line 32 extending through points 24 and 26 with the plane 28. A line of projection 34 between points 22 and 26 intersects the plane 28 at a point 36 having coordinates ($v_1$, $w_1$), when the ratio of the length of a line from point 26 to point 30 to the length of a line from point 26 to point 24 has a value of "$k$" with the values $v_1$ and $w_1$ being determined by the equations:

$$\delta = \sqrt{x_e^2 + y_e^2}$$
$$\alpha = \sqrt{x_e^2 + y_e^2 + z_e^2}$$
$$D = \alpha^2 - (x_e x_i + y_e y_i + z_e z_i)$$
$$v_i = \frac{k\alpha^2}{\delta D}[-y_e x_i + x_e y_i]$$
$$w_i = \frac{k\alpha}{\delta D}[-x_e z_e x_i - y_e z_e y_i + \delta^2 z_i]$$

The program 14 includes subroutines to compute sequentially the values of $v_1$ and $w_1$ for each object point ($x_i$, $y_i$, $z_i$) sequentially given in the manuscript 10 with instructions for such point to be selected in the planar representation.

It is noted that the point 24 at the origin of the mutually perpendicular coordinate axis X, Y, Z. If the positional information originally specified in the manuscript 10 is referenced to a different coordinate system, the program 14 includes a subroutine to translate the original coordinate system to a position such that the origin is at point 24. This can be accomplished simply by subtracting the original coordinates of point 24 from all sets of original coordinates, as will be evident to those skilled in the art.

As originally presented, the object can be of such a nature that two sets of desired object points are symmetrical to a plane, in which case only one set of the symmetrical sets of object points must be given in the manuscript, upon the program 14 including a subroutine to generate or compute the symmetrical set of object points. For example, an airplane can be oriented with respect to the original coordinate axes so that the X–Z plane is a vertical longitudinal section of the airplane. In this case two sets of object points corresponding to the right and left sides of the airplane can be defined by specifying (for example) only right-hand object points with instructions given in the computer language to generate a symmetrical set of points in which the coordinates of each original point is supplemented by the coordinates of a second object point differing only in that the sign of the $y$ coordinate is changed after which translation of the origin of the coordinate axis system can be translated as may be required by the specification of the center of interest, it being noted that the center of interest point may have an original $y$ coordinate other than zero. Of course, no symmetrical image of the center of interst point is generated.

Two stereoscopic planar representations can be made constituted of two perspectives related as by having eye points spaced an arbitrarily selected distance of "$g$" units apart and equally spaced on opposite sides of the eye point 26 previously described, such spaced eye points being on a line perpendicular to the line 32. The stereoscopically related perspectives can be successively generated on appropriate instructions in the language of the computer 12 and the program 14 and upon furnishing additional information so as to the value of $g$, with the computations being based on two generated viewpoints ($x_{el}$, $y_{el}$, $z_{el}$) and ($x_{er}$, $y_{er}$, $z_{er}$) in lieu of the given eye point 26 ($x_e$, $y_e$, $z_e$), more appropriately in this case termed the eye center point. The generated eye points can be considered the views presented to the left and right eyes of an observer. The two sets of projections ($v_{il}$,$w_{il}$) and ($v_{ir}$, $w_{ir}$) are computed from the calculated coordinates of eye points ($x_{el}$, $y_{el}$, $z_{el}$) and ($x_{er}$, $y_{er}$, $z_{er}$). The two eye points (right hand and left hand) are generated or computed from the equations:

$$\delta = \sqrt{x_{ec}^2 + y_{ec}^2}$$
$$x_{el} = x_{ec} - \frac{g y_{ec}}{2\delta}$$
$$y_{el} = y_{ec} + \frac{g x_{ec}}{2\delta}$$
$$z_{el} = z_{ec}$$
$$x_{er} = x_{ec} + \frac{g y_{ec}}{2\delta}$$
$$y_{er} = y_{ec} - \frac{g x_{ec}}{2\delta}$$
$$z_{er} = z_{ec}$$

The sets of projections ($v_{il}$, $w_{il}$) and ($v_{ir}$, $w_{ir}$) can be respectively obtained as all object points ($x_i$, $y_i$, $z_i$) on solving the following equations for $v_j$ and $w_j$ on substitution of the respective coordinate values of ($x_{el}$, $y_{el}$, $z_{el}$) and ($x_{er}$, $y_{er}$, $z_{er}$) for ($x_j$, $y_j$, $z_j$), with $k$ having the value of the ratio of the distance from the eye center point ($x_{ec}$, $y_{ec}$, $z_{ec}$) to the projection or picture plane 28 to the distance from the eye center point to the center of interest point (O, O, O):

$$\delta = \sqrt{x_j^2 + y_j^2}$$
$$\alpha = \sqrt{x_j^2 + y_j^2 + z_j^2}$$
$$D = \alpha^2 - [x_j x_i + y_j y_i + z_j z_i]$$
$$v_j = \frac{k\alpha^2}{\delta D}[-y_j x_i + x_j y_i]$$
$$w_j = \frac{k\alpha}{\delta D}[-x_j z_j x_i - y_j z_j y_i + \delta^2 z_i]$$

Figure 3:
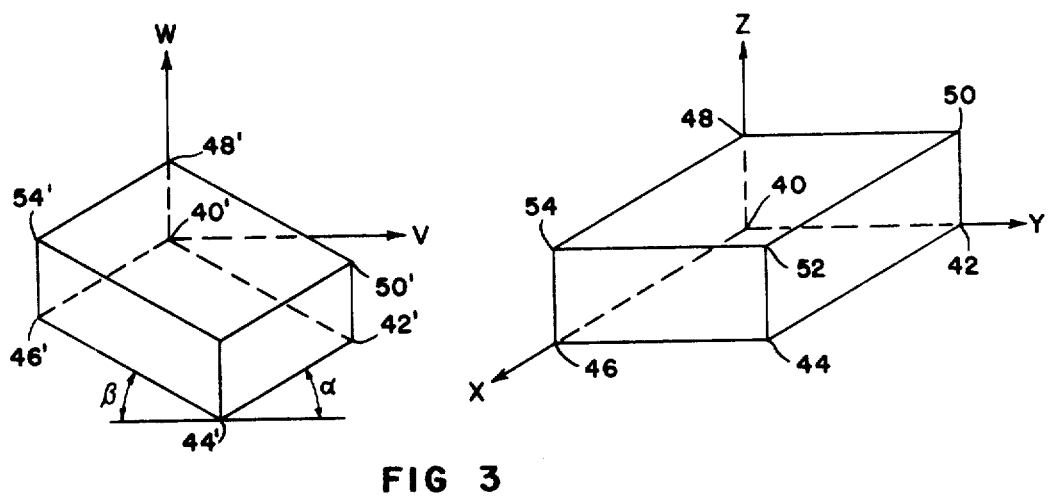
FIG. 3 is a graphical illustration of the manner in which special cases of axonometric projections are obtained; and, FIG. 4 is a typical example of a perspective representation of an object obtained in the practice of the invention.

Having described how perspective projections (where all projection lines converge to a point) are obtained, axonometric or parallel line projections in general are described hereinafter, including the special cases of isometric, dimetric, trimetric and oblique projections. Attention is now directed to FIG. 3 for an understanding of the generation of a set of two-dimensional coordinates from a set of three-dimensional coordinates, such that the former can constitute an axonometric or parallel line projection of the latter. FIG. 3 illustrates a graphical representation of a rectangular block relative to a mutually perpendicular coordinate axes system X, Y, Z, with respect to which the coordinate positions $(x_i, y_i, z_i)$ of apical points 40, 42, 44, 46, 48, 50, 52, and 54 are known, with such points being shown as projection points 40', 42', 44', 46', 48', 50', 52' and 54' relative to a two-dimensional, mutually perpendicular coordinate axes system V, W as a projection. The projection is such that lines parallel to the X axis on projection make an angle $\alpha$ with the V axis; lines parallel to the Z axis on projection are parallel to the W axis; and lines parallel to the Y axis on projection are inclined to the V axis by an angle $\beta$ as shown. It is to be understood that the angular values $\alpha$ and $\beta$ are arbitrary and each can have an arbitrary value assigned thereto in the range of 0° to ±90°. The projection on the V, W coordinate system can constitute an oblique, isometric, dimetric or trimetric projection being all special cases of axonometric projection on appropriate assignment of values for the angles $\alpha$ and $\beta$, and a scale factor $\gamma$.

Appropriate assignment of values to $\alpha$ and $\beta$ for a desired type of projection can be ascertained upon inspection of the following table:

| Type | $\alpha$ | $\beta$ | $\gamma$ |
|---|---|---|---|
| Isometric projection | 30° | 30° | 0.81 |
| Isometric drawing | 30° | 30° | 1. |
| Dimetric projection | Arc tan ⅞ or 40°11'. | Arc tan ⅛ or 7°7½'. | 1. |
| Trimetric projection | 45° | 15° | 1. |
| Oblique projection | 45° | 0 | 1. |

Having selected desired values for $\alpha$, $\beta$ and $\gamma$, the two coordinate points of projection $(v_i, w_i)$ for each of the given object points $(x_i, y_i, z_i)$ is computed according to the equations:

$$v_i = \gamma[-x_i \cos \alpha + y_i \cos \beta]$$
$$w_i = \gamma[-x_i \sin \alpha - y_i \sin \beta + z_i]$$

It will be appreciated that the freedom of choice afforded in the assignment of values to $\alpha$ and $\beta$ enables calculation of the coordinates of points of a large number of types of projection other than those specifically given in the above table. Assignment of value to $\gamma$ amounts to a choice of a scale factor, which can be a considerable advantage in controlling the size of the planar representation produced by the plotting device 20. As will be evident to those skilled in the art, a similar scale factor can be incorporated in the equations for perspective projections, though in practical effect this is realized on assignment of or value to the constant "$k$."

Flexibility in the orientation of the projection can be obtained on interchanging the designations of the three-dimensional coordinate axes. For example, the Y and Z axes or coordinate values can be interchanged, so that a point (object point) having coordinates $(a, b, c)$ would become $(a, c, b)$ for use in the above equations.

It is obviously well within the ordinary skill of programmers to process the equations hereinbefore given into logic flow charts or diagrams and to translate the latter into computer subroutines for solution of such equations along with a compatible computer language for processing input data and instructions to produce an output directly (or on post processing) useful for controlling a planar plotter.

In typical practice of the invention, it can be desired to produce a perspective of an aspect of an object having, for example, a feature that can be described in three dimensions by point $P_1$, a line connecting $P_1$ to point $P_2$, a line connecting $P_2$ to a point $P_3$, point $P_4$ and a line connecting $P_4$ to $P_1$. Point $P_5$ is arbitrarily selected as being in the middle of the group of points $P_1$, $P_2$, $P_3$ and $P_4$. It is desired that the feature be viewed as from an arbitrarily selected point $P_6$ as the same would be seen on a perpendicular plane midway between the points $P_5$ and $P_6$. The input data would include the coordinates of points $P_1$, $P_2$, $P_3$, $P_4$, $P_1$ in sequence with an instruction between the coordinates of points $P_3$ and $P_4$ to omit a connecting line segment. The input data would also specify the value of $k$ in this case as 0.5 and the coordinates of point $P_6$. The computer 12 and its program 14 would then generate corresponding projection points $P_1'$, $P_2'$, $P_3'$, $P_4'$ in sequence in terms of two coordinates, with an appropriate instruction for the plotter intervening between the listed coordinates of point $P_3'$ and $P_4'$ to omit a connecting line between such points. This output data would then be fed to and control the plotter 20 to trace a straight-line segment from $P_1'$ to $P_2'$, thence to $P_3'$, whereupon a trace comprising a straight-line segment from $P_4'$ to $P_1'$ would be made. In most conventional pen-type plotters the tracing element or pen would travel a straight-line path from $P_3'$ to $P_4'$ though retracted slightly from tracing position.

An axonometric-type projection can in an analogous manner be derived from the same type of input data concerning points $P_1$, $P_2$, $P_3$, and $P_4$ by modifying the latter to omit information concerning $P_5$, $P_6$ and $k$, in lieu thereof specifying values for $\alpha$, $\beta$ and $\gamma$. Projection points $P_1''$, $P_2''$, $P_3''$ and $P_4''$ would be derived so that the plotter 20 would trace a straight-line segment from $P_1''$ to $P_2''$, thence to $P_3''$, whereupon a trace comprising a straight-line segment from $P_1''$ to $P_2''$, thence to $P_3''$, whereupon a trace comprising a straight-line segment from $P_4''$ to $P_1''$ would be made.

From the foregoing it will be seen that the prodigious calculating capabilities (both as to speed and quantity of data) of digital computers have been made available upon the practice of this invention to the making of planar representations of three-dimension objects as well as two-dimensional objects (though input data of the latter can be in terms of three coordinates). Not only can great speed be attained in making planar representations, but actual experience has shown that great economies are realized over producing a corresponding end product by other means (such as by a draftsman).

The manuscript or input data descriptive of a particular object can be retained for future use to present some other planar aspect of the object. For instance, data descriptive of an airplane can be initially used to show one feature (wing structure) and subsequently used to show another feature such as the view of a pilot through the windshield, assuming the input data specifies with respect to each input point the feature category or categories to which it pertains so as to afford a selective basis for computations based on subsets of points pertaining to selected features for portrayal (points of wing structure being distinguished from windshield peripheral points, for example).

The invention has been described in considerable detail to afford an understanding thereof, no implication of narrowness of the scope of invention being intended, and accordingly reference should be made to the appended claims to determine the actual scope of the invention.

We claim:

1. A system for providing a drawing of an object comprising in combination: electronic digital computer means programmed to respond to applied signals $(x_e, y_e, z_e)$ and a series of groups of signals $(x_i, y_i, z_i)$ to provide a corresponding series of pairs of output signals $(v_i, w_i)$ with the relationship between signals $(x_i, y_i, z_i)$ and $(x_e, y_e, z_e)$ to the signals $(v_i, w_i)$ being defined as follows:

$$v_i = \frac{k(x_e^2+y_e^2+z_e^2)(-y_e x_i + x_e y_i)}{\sqrt{(x_e^2+y_e^2)}[(x_e^2+y_e^2+z_e^2)-(x_e x_i + y_e y_i + z_e z_i)]}$$

$$w_i = \frac{k\sqrt{(x_e^2+y_e^2+z_e^2)}}{\sqrt{(x_e^2+y_e^2)}} \left( \frac{-x_e z_e x_i - y_e z_e y_i + z_i(x_e^2+y_e^2)}{[(x_e^2+y_e^2+z_e^2)-(x_e x_i + y_e y_i + z_e z_i)]} \right)$$

where $k$ is a selectable variable; signal means coupled with said computer means and providing said signals $(x_i, y_i, z_i)$ and $(x_e, y_e, z_e)$ thereto with said signals $(x_i, y_i,$ $z_i$) representing the three dimensional co-ordinates of selected points on the object and with said signals ($x_e$, $y_e$, $z_e$) representing the three dimensional co-ordinates of the location of the observation point from which the object is seen; and planar plotting means coupled with said computer means and responsive to said signals ($v_i$, $w_i$) to make a drawing of the object.

2. Apparatus for producing in a plane having co-ordinate axes $v$ and $w$ therein a planar representation of a three dimensional object having known three dimensional co-ordinates ($x_i$, $y_i$, $z_i$) referenced to three mutually perpendicular axes $x$, $y$, and $z$, with said planar representation corresponding to a view of the object as seen from an eye point located at the co-ordinate ($x_e$, $y_e$, $z_e$) in said three dimensional system when the observer is looking toward a center of interest point having co-ordinates (O, O, O) comprising in combination: digital computer means programmed to automatically solve the following equations:

$$\delta = \sqrt{x_e^2 + y_e^2}$$
$$\alpha = \sqrt{x_e^2 + y_e^2 + z_e^2}$$
$$D = \alpha^2 - (x_e x_i + y_e y_i + z_e z_i)$$
$$v_i = \frac{k\alpha^2}{\delta D}[-y_e x_i + x_e y_i]$$
$$w_i = \frac{k\alpha}{\delta D}[-x_e z_e x_i - y_e z_e y_i + \delta^2 z_i]$$

wherein $k$ is the ratio of the distance from the eye point to the plane to the distance from the eye point to the center of interest point, information input means coupled to said computer means for applying thereto the numerical data corresponding to the three dimensional co-ordinates ($x_e$, $y_e$, $z_e$), and corresponding to a plurality of individual points ($x_i$, $y_i$, $z_i$) of said object; and planar plotting means coupled to said computer means and responsive to the output signals ($v_i$, $w_i$) to selectively connect by straight lines selected points ($v_i$, $w_i$) on a display medium containing the said $v$, $w$ axes.

3. A planar presentation display system for providing on a plane surface having ($v$, $w$,) co-ordinates therein, a drawing of a three dimensional object having a plurality of known three dimensional co-ordinates ($x_i$, $y_i$, $z_i$) corresponding to various points on the surface of the object and referenced to the origin of a three dimensional co-ordinate system having axes $x$, $y$ and $z$, with the planar drawing of the object corresponding to the appearance of the object as seen in a plane perpendicular to a line extending from an observation point having known co-ordinates ($x_e$, $y_e$, $z_e$) in said three dimensional co-ordinate system to the origin of the said three dimensional co-ordinate system, comprising in combination: electronic digital computer means responsive to the application of said co-ordinates ($x_e$, $y_e$, $z_e$) and a plurality of co-ordinates ($x_i$, $y_i$, $z_i$) to solve the following equation in sequence and to provide a series of output signals ($v_i$, $w_i$) corresponding to points on said plane surface:

$$\delta = \sqrt{x_e^2 + y_e^2}$$
$$\alpha = \sqrt{x_e^2 + y_e^2 + z_e^2}$$
$$D = \alpha^2 - (x_e x_i + y_e y_i + z_e z_i)$$
$$v_i = \frac{k\alpha^2}{\delta D}[-y_e x_i + x_e y_i]$$
$$w_i = \frac{k\alpha}{\delta D}[-x_e z_e x_i - y_e z_e y_i + \delta^2 z_i]$$

wherein $k$ is the ratio of the distance from the eye point to the plane to the distance from the eye point to the center of interest point, and planar plotting means coupled to said computer means for automatically plotting the location of said computed points ($v_i$, $w_i$) and selectively connecting selected ones of said points ($v_i$, $w_i$), said computer means including means providing control information to said plotting means to control the selection of points ($v_i$, $w_i$) between which a line is to be drawn.

References Cited

UNITED STATES PATENTS

| | | | |
|---|---|---|---|
| 3,066,868 | 12/1962 | Tripp | 235—151 |
| 3,153,224 | 10/1964 | Taylor | 340—177.5 |

PAUL J. HENON, Primary Examiner

U.S. Cl. X.R.

235—151